United States Patent
Voelker

(10) Patent No.: US 11,892,040 B2
(45) Date of Patent: Feb. 6, 2024

(54) CLUTCH ASSEMBLY HAVING INTEGRATED CLUTCHES

(71) Applicant: Means Industries, Inc., Saginaw, MI (US)

(72) Inventor: Brandon J. Voelker, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/860,233

(22) Filed: Jul. 8, 2022

(65) Prior Publication Data

US 2023/0009340 A1 Jan. 12, 2023

Related U.S. Application Data

(60) Provisional application No. 63/219,653, filed on Jul. 8, 2021.

(51) Int. Cl.
*F16D 41/14* (2006.01)
*F16D 27/102* (2006.01)

(52) U.S. Cl.
CPC ............ *F16D 41/14* (2013.01); *F16D 27/102* (2013.01)

(58) Field of Classification Search
CPC ......... F16D 41/12–16; F16D 67/00–06; F16D 27/102
See application file for complete search history.

(56) References Cited

U.S. PATENT DOCUMENTS

| | | | |
|---|---|---|---|
| 2015/0204390 A1* | 7/2015 | Kimes | F16D 41/125 192/84.8 |
| 2021/0041022 A1* | 2/2021 | Kimes | F16H 63/304 |
| 2022/0010855 A1* | 1/2022 | Liebert | F16D 27/10 |
| 2022/0112926 A1* | 4/2022 | Lee | F16D 41/084 |

* cited by examiner

*Primary Examiner* — David R Morris
(74) *Attorney, Agent, or Firm* — Burgess Law Office, PLLC

(57) ABSTRACT

A clutch assembly includes a first clutch in the form of a dynamically controllable clutch (DCC) and a second clutch in the form of an electrically actuated Controllable Mechanical Diode ("CMD") clutch. The DCC and the CMD clutch each have a pocket plate and share a notch plate. The DCC pocket plate and the shared notch plate are supported for rotation in first and second directions about a rotational axis. The pocket plate of the CMD clutch is fixed in position. The DCC includes a translator to move a DCC locking element to a deployed position mechanically coupling the DCC pocket plate and the shared notch plate. The CMD clutch includes first and second actuators configured to move the first and second locking elements of the CMD clutch to a deployed position mechanically coupling the shared notch plate to the pocket plate of the CMD clutch.

20 Claims, 11 Drawing Sheets

CLUTCH ASSEMBLY HAVING INTEGRATED CLUTCHES

CROSS-REFERENCE TO RELATED APPLICATIONS

This application claims the benefit of U.S. Provisional Application No. 63/219,653, filed Jul. 8, 2021. The disclosure of the above application is incorporated herein by reference.

BACKGROUND OF THE INVENTION

1. Field of the Invention

The present invention generally relates to automotive clutch assemblies; and, more specifically, to clutch assemblies controlling engagement and disengagement components.

2. Description of Related Art

A one-way clutch ("OWC") often includes a first coupling (or clutch) member, a second coupling member, and at least one locking element. The locking element is movable between (i) a deployed (engaged) position in which the locking element extends from the first coupling member and engages the second coupling member and (ii) a non-deployed (disengaged) position in which the locking element does not extend from the first coupling member and does not engage the second coupling member. When the locking element is deployed and engages the second coupling member, the OWC locks in one direction of rotation but has free rotation in the opposite direction. Two types of OWCs often used in vehicular automatic transmissions include roller-type clutches, which can include spring-loaded rollers between inner and outer races of the OWC, and sprag-type clutches, which can include asymmetrically shaped wedges located between inner and outer races of the OWC.

A selectable OWC (also known as a two-way clutch) adds a second set of locking elements in combination with a selector plate. The second locking element and the selector plate add multiple functions to the OWC. A selectable OWC ("SOWC") can produce a mechanical connection between rotating or stationary components in one or both directions and overruns in one or both directions. A SOWC contains an externally controlled selection mechanism movable between positions for adjusting the selector plate to different operating modes of the SOWC.

One type of SOWC is a static SOWC with a stationary race, splined to a transmission case, for example, and a rotatable race. In an electrically actuated, static SOWC (eSOWC), a single locking element combined with a solenoid is used in place of the selector plate. Activating the solenoid causes a solenoid plunger to push the single locking element into the engaged position. Torque can then be transmitted. When the solenoid is turned off, a return spring forces the single locking element to the disengaged position.

An electrically Controllable Mechanical Diode (CMD-e) clutch is a static SOWC that uses an electric motor in electric/hybrid propulsion systems. With the electric motor, precise synchronization is achievable, allowing two independent controllable locking elements to be used. Consequently, a first locking element combined with a first solenoid replaces the first set of locking elements, and a second locking element combined with a second solenoid replaces the second set of locking elements, eliminating the selector plate. The first locking element transmits torque in one direction, and the second locking element transmits torque in the other direction. Independent control of each solenoid allows torque transmission in one direction and freewheeling in the other or vice versa. Simultaneously engaging both solenoids creates a clutch brake function (no-way clutch).

Referring now to FIGS. 1A, 1B, and 1C (collectively "FIGS. 1"), a clutch assembly 10 having a CMD-e clutch 12 in accordance with the prior art is shown. CMD-e clutch 12 has a radially outer fixed race, i.e., a first coupling member in the form of a pocket plate 16, and a radially inner rotating race, i.e., a second coupling member in the form of a notch plate 18. Pocket plate 16 is fixedly connected to a stationary component such as a transmission case. Notch plate 18 is mounted for rotation relative to pocket plate 16 about a rotational axis 20.

Notch plate 18 includes a coupling face 22 facing radially outward from rotational axis 20. Coupling face 22 has a set of locking teeth or notches ("notches") 24 formed therein. Notch plate 18 has a set of splines 26 formed on its inner diameter for drivingly engaging a drive/driven shaft member (not shown) for rotation about rotational axis 20.

A locking or retainer ring 28 inserts into an annular groove of an axially extending wall of pocket plate 16 to hold pocket and notch plates 16 and 18 together. Rivets 30 are employed to affix retainer ring 28 to pocket plate 16 for this purpose.

Pocket plate 16 includes a coupling face 32 facing radially inward toward rotational axis 20. Coupling face 32 of pocket plate 16 and coupling face 22 of notch plate 18 face one another, as shown in FIGS. 1B and 1C.

Pocket plate 16 has a pair of raised, receiving portions 34a, 34b on its outer diameter. Each receiving portion 34a, 34b has a slit (not shown). The slits of receiving portions 34a, 34b extend completely through pocket plate 16 to coupling face 32 of pocket plate 16.

Pocket plate 16 further includes a pair of locking elements, struts, or pawls ("locking struts") 36a, 36b. As shown in FIGS. 1B and 1C, locking struts 36a, 36b are respectively disposed within pockets 40a, 40b of receiving portions 34a, 34b of pocket plate 16. Strut return springs 38a, 38b are respectively associated with locking struts 36a, 36b. As shown in FIGS. 1B and 1C, strut return springs 38a, 38b are respectively disposed within spring recesses (not numbered) of receiving portions 34a, 34b and are in operative arrangement with their respective locking struts 36a, 36b.

The locking struts 36a, 36b can extend between coupling face 32 of pocket plate 16 and the coupling face 22 of the notch plate 18, between a non-deployed position, shown in FIG. 1B, and an engaged position, shown in FIG. 1C. The non-deployed position is characterized by non-abutting engagement of a locking strut 36 with a load-bearing surface of the corresponding pocket 40 of pocket plate 16 and a load-bearing shoulder of a notch 24 of notch plate 18. The engaged position is characterized by abutting engagement of a locking strut 36 with a load-bearing surface of the corresponding pocket 40 of pocket plate 16 and a load-bearing shoulder of a notch 24 of notch plate 18.

A pair of electromechanical components 14a, 14b ("solenoids" or "actuators") respectively include a reciprocating member (e.g., plunger, rod, etc.) 42a, 42b. Plungers 42a, 42b are movable between extended and retracted positions. As shown in FIGS. 1B and 1C, solenoids 14a, 14b are respectively received by receiving portions 34a, 34b of pocket plate 16. Plunger 42a reciprocates to move the locking strut 36a disposed in the pocket 40a across a gap between the coupling faces 32, 22 of the pocket 16 and notch 18 plates in response to the solenoid 14*a* receiving an electrical control signal. In this case, the locking strut 36*a* engages a notch 24 of notch plate 18 in the engaged position of the locking strut 36*a*, shown in FIG. 1C, to prevent counter-clockwise (CCW) rotation of the notch plate 18 about the rotational axis 20. Likewise, plunger 42*b* reciprocates to move locking strut 36*b* disposed in pocket 40*b* across a gap between radially facing coupling faces 32 and 22 in response to solenoid 14*b* receiving an electrical control signal. In this case, locking strut 36*b* engages a notch 24 of notch plate 18 in an engaged position of locking strut 36*b*, shown in FIG. 1C, to prevent clockwise (CW) rotation of notch plate 18 about rotational axis 20.

A pair of position sensors 44*a*, 44*b* are operable for sensing the position of the locking struts 36*a*, 36*b*. A speed sensor 46 is operable for sensing the rotation speed of the notch plate 18 relative to the pocket plate 16 about the rotational axis 20.

CMD-e clutch 12 is an electronically controlled clutch brake with radial torque transmitting elements (i.e., locking struts 36*a*, 36*b*). The first solenoid 14*a* controls a first strut 36*a* by pushing the first strut into notch plate 18 so that it can transmit torque or prevent rotation of the notch plate in a first direction. Likewise, the second solenoid 14*b* controls a second strut 36*b* by pushing the second strut into notch plate 18 so that it can transmit torque or prevent rotation in an opposite second direction opposite.

In sum, as described and shown in FIG. 1B, solenoids 14*a*, 14*b* are magnetically latched-in an off position by a magnetic latch force F. The plungers 42 are retracted and do not contact the locking struts 36. Consequently, strut return springs 38 are extended with locking struts 36 being disengaged from notches 24 and not transmitting torque. The notch plate 18 can rotate in both the CW and CCW directions (i.e., "freewheel" in CW or CCW directions).

In sum, as described and shown in FIG. 1C, solenoids 14*a*, 14*b* are magnetically latched in an on position by a magnetic latch force F. As such, plungers 42 are extended, and contact locking struts 36. Consequently, strut return springs 38 are compressed with locking struts 36 engaged to notches 24 and transmitting torque. Pocket plate 16 and notch plate 18 are locked together and grounded to the transmission case. Notch plate 18 cannot rotate in either the CW or CCW directions.

As described, the first and second solenoids 14*a*, 14*b* can be energized together or independently to provide four modes of operation: (1) freewheel in both CW and CCW directions (notch plate 18 rotatable in both CW and CCW directions—both struts 36*a*, 36*b* are in non-coupling position); (2) one-way clutch CCW (notch plate 18 rotatable in CCW direction and locked in CW direction—strut 36*a* in non-coupling position and strut 36*b* in coupling position); (3) one-way clutch CW (notch plate 18 rotatable in CW direction and locked in CCW direction—strut 36*a* in coupling position and strut 36*b* in non-coupling position); and (4) locked both CW and CCW directions (notch plate 18 locked in both CW and CCW directions—both struts 36*a*, 36*b* are in coupling position).

These four modes of operation allow CMD-e clutch 12 to function as a "park-lock, hill-hold clutch" (i.e., a clutch-brake 4-mode CMD).

Dynamic clutches are clutches in which the first and second races are both rotatable. A Dynamically Controllable Clutch (or dynamically selectable clutch) ("DCC") fits or packages in clutch positions where typically dog clutches, synchronizers, and wet friction packs would be located. Using electric actuation, the DCC eliminates the need for hydraulic systems and creates substantial packaging and system efficiency benefits.

However, unlike the CMD-e clutch, the dynamic functionality of the DCC does not allow for solenoids to be used for engaging and disengaging locking elements. Therefore, as discussed below, the DCC uses an actuation system involving a linear actuator to control locking elements while both races are rotating.

Referring to FIGS. 2A, 2B, 2C, 2D, and 2E (collectively "FIGS. 2"), a DCC 112 in accordance with the prior art will be described. DCC 112 is a component of a system (not shown), such as an automotive transmission, further having an input power flow component (e.g., a drive gear) and an output power flow component (e.g., a driven shaft).

DCC 112 has a radially inner rotating race, i.e., a first coupling member in the form of a pocket plate 113, and a radially outer rotating race, i.e., a second coupling member in the form of a notch plate 116. The pocket plate 113 is fixedly connected to a first power flow component of the system, and the notch plate 116 is fixedly connected to a second power flow component of the system. Consequently, the first and second power flow components are connected when pocket and notch plates 113 and 116 are connected.

The pocket plate 113 contains first and second sets of radial locking elements 126 for clockwise ("CW") and counterclockwise ("CCW") engagement. During engagement, at least one of the sets of locking elements 126 simultaneously contacts the pocket and notch engagement faces of the pocket and notch plates 113, 116, thereby connecting the pocket and notch plates. Connecting the pocket and notch plates 113, 116 connects the first and second power flow components. Consequently, in each locked direction of rotation, the DCC 112 transmits torque between the power flow components, which are connected via the connected pocket and notch plates 113, 116.

DCC 112 is electrically actuated by an actuation system in the form of a linear motor ("linear actuator") 114. Linear actuator 114 includes a stator 122 and a translator 120. Stator 122 is fixed in position, such as being fixed to a transmission case (not shown) via mounts 147. Stator 122 includes a pair of copper wire induction coils 144 and 146. Steel plates 148, 150, and 152 provide a housing for stator coils 144 and 146. Stator coils 144 and 146 are wound in series with reversed polarity relative to one another (anti-series).

Translator 120 is linearly movable between lateral (i.e., axial) positions. Translator 120 is fixedly connected to and rotates with pocket plate 113. Translator 120 includes an annular ring of segmented permanent magnets 121, steel plates 123 and 125, and rigid plungers 130. Plungers 130 operate locking elements 126. Plungers 130 extend through holes formed through a carriage 151 of translator 120 and are biased by springs 134. Plungers 130 are threaded at their ends and secured within their holes by internally threaded nuts 135. Conical ends of plungers 130 extend through the apertures of a ring 155.

FIGS. 2B, 2C, 2D, and 2E detail how the linear actuator 114 controls locking elements 126. Plungers 130 within translator 120 directly contact locking elements 126 and cause them to pitch up or down depending on actuation direction. Linear actuator 114 has an "off" position (shown in FIGS. 2B and 2D) and an "on" position (shown in FIGS. 2C and 2E). The linear actuator 114 switches between the "off" and "on" positions by causing translator 120 to laterally move between, in this case, a right-most position (shown in FIGS. 2B and 2D) and a left-most position (shown in FIGS. 2C and 2E).

When translator 120 moves from "off" to "on," each plunger 130 contacts the under face or surface of its locking element 126 so the locking element can engage into notch plate 116. DCC 112 can transmit torque in each locked direction of rotation when the locking elements 126 engage with notch plate 116. A return spring 128 under each locking element 126 is compressed during the engaged state. When commanded "off," translator 120 moves back toward the "off" position, and plungers 130 lose contact with locking elements 126. Compressed return springs 128 create a force that causes locking elements 126 to pitch downward or disengage. Once a torque removal occurs, locking elements 126 can disengage, and DCC 112 can freewheel.

To change the state from "off" to "on," an electrical current energizes the stator coil 146 nearest to the translator 120. Energized induction coil 146 produces a magnetic field that repels the steady-state field generated by permanent magnets 121, while the far stator coil 144 produces an attractive magnetic field. The combination of repelling and attracting forces caused by stator coils 144 and 146 causes translator 120 to move.

Once translator 120 passes over center stator steel plate 150, a permanent magnet 121 attempts to fully align leftmost stator steel plate 148. A mechanical stop 153 (FIGS. 2D and 2E) prevents complete alignment, which results in a biasing force that holds translator 120 in the "on" position. Translator 120 is magnetically latched in the "on" position.

To disengage the DCC 112, an electrical current is applied to the stator coil 144 nearest to translator 120 (formerly far stator coil 146), and linear actuator 114 moves from the "on" stop 153 to a ring which functions as an "off" stop 142 in a similar manner described above. The "off" mechanical stop 142 prevents complete alignment of permanent magnet 121 and right-most stator steel plate 152, remaining magnetically latched in the "off" position.

SUMMARY OF THE INVENTION

A clutch assembly including first and third coupling members supported for rotation relative to one another in first and second directions about a rotational axis and a second coupling member fixed in position. The clutch assembly has a first locking element movable between a deployed position, in which the first locking element mechanically couples the first and third coupling members together to prevent relative rotation of the first and third coupling members in at least one direction about the rotational axis and a non-deployed position, in which the first and third coupling members are not mechanically coupled together by the first locking element whereby the first and third coupling members may rotate relative to one another about the rotational axis. The clutch assembly also has a second locking element movable between a deployed position, in which the second locking element mechanically couples the second and third coupling members together to prevent rotation of the third coupling member relative to the second coupling members in a first direction about the rotational axis, and a non-deployed position, in which the second and third coupling members together are not mechanically coupled by the second locking element whereby the third coupling member can rotate relative to the second coupling member in the first direction about the rotational axis. The clutch assembly also includes a first actuator connected to the first locking element, the first actuator moving the first locking element to one of the deployed and non-deployed positions, and a second actuator connected to the second locking element, the second actuator moving the second locking element to one of the deployed and non-deployed positions.

Further areas of applicability of the present invention will become apparent from the detailed description provided hereinafter. It should be understood that the detailed description and specific examples while indicating the preferred embodiment of the invention, are intended for illustration only and not to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or its uses.

Figure 1A:
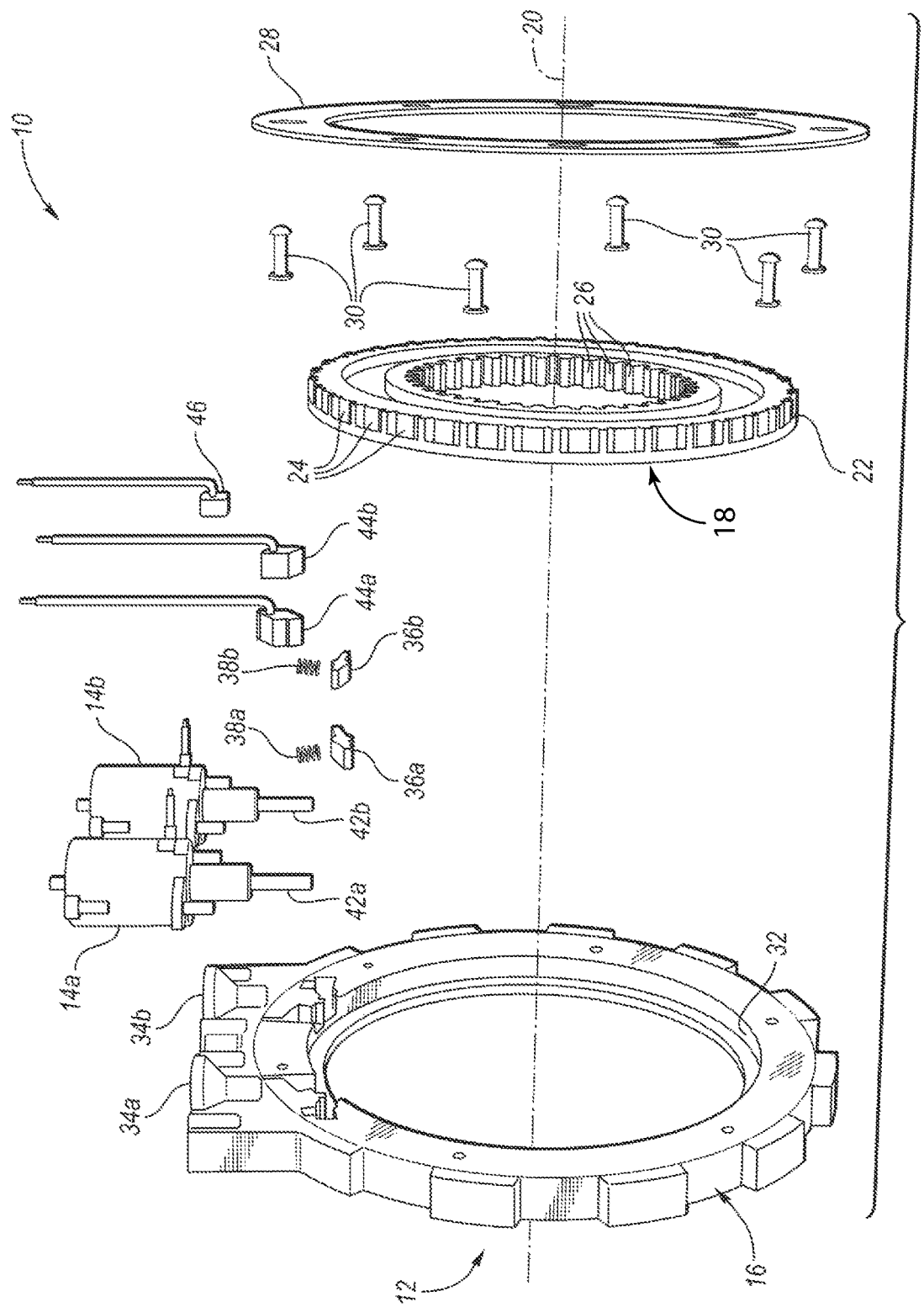
FIG. 1A is an exploded view of a clutch assembly having an electrically actuated Controllable Mechanical Diode ("CMD-e") clutch in accordance with the prior art, the CMD-e clutch functioning as a park-lock, hill-hold clutch ("park-lock clutch")
Figure 1B:
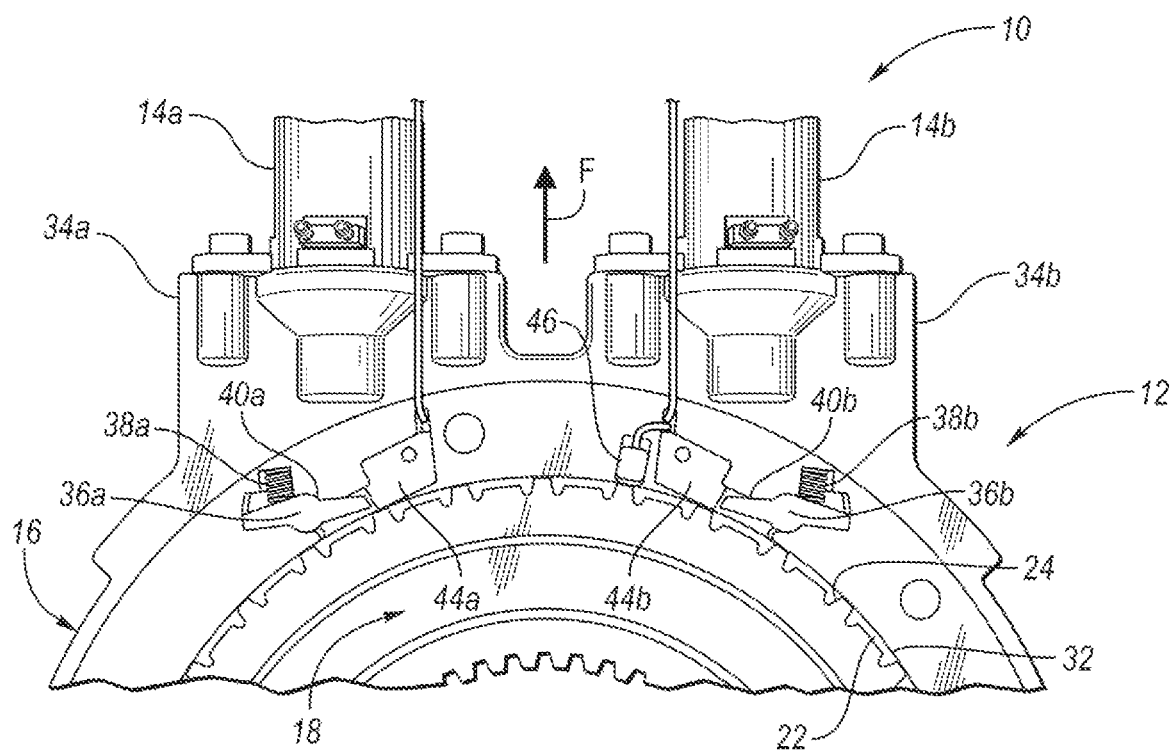
FIG. 1B is a cross-sectional, partial view of the park-lock clutch with both of its electromechanical components being in a magnetically latched-off position whereby the clutch is in an "overrun" operating mode.
Figure 1C:
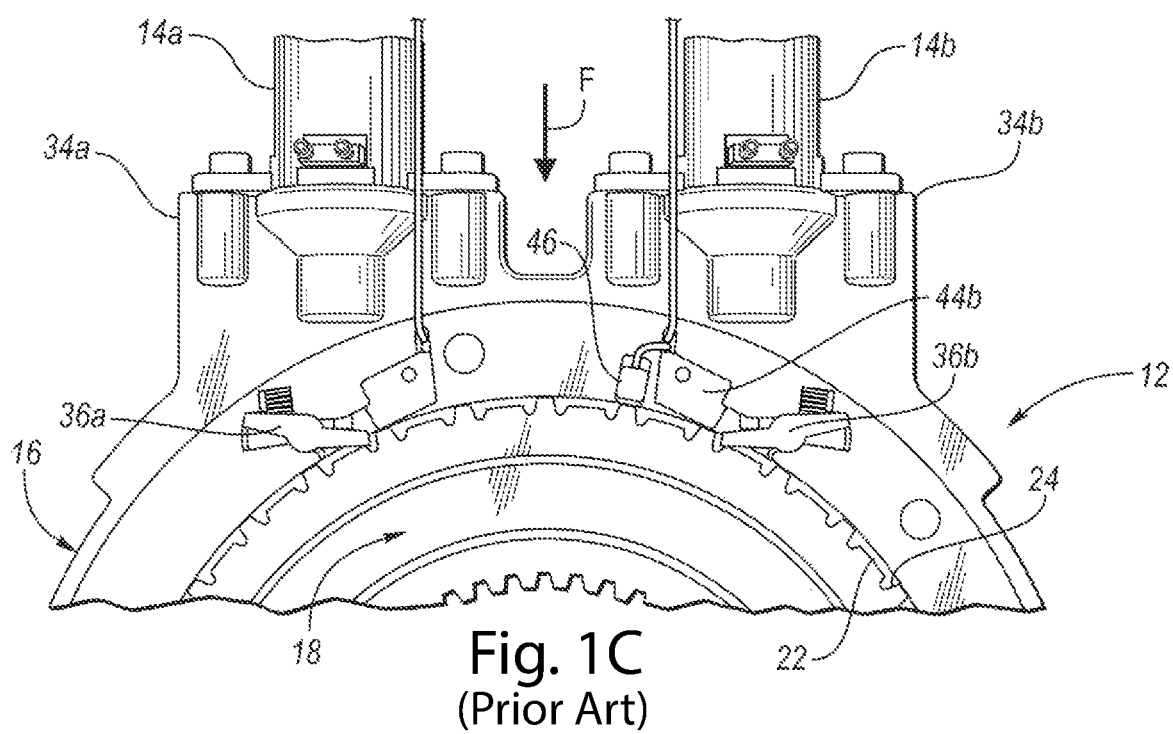
FIG. 1C is a cross-sectional, partial view of the park-lock clutch with both its electromechanical components being a magnetically latched-on position whereby the clutch is in a fully "locked" operating mode.
Figure 2A:
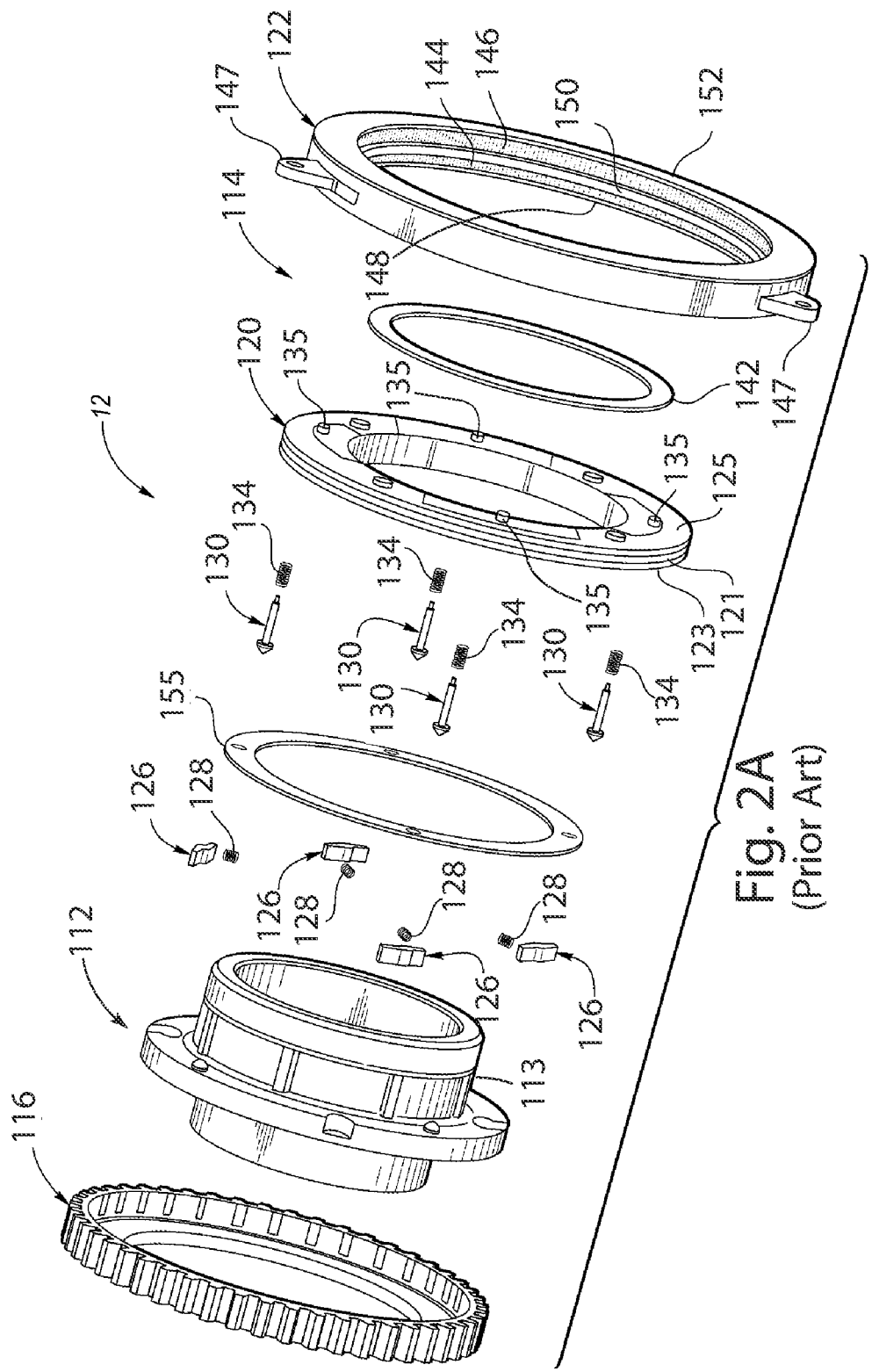
FIG. 2A is an exploded view of a dynamically controllable clutch ("DCC") in accordance with the prior art.
Figure 2B:
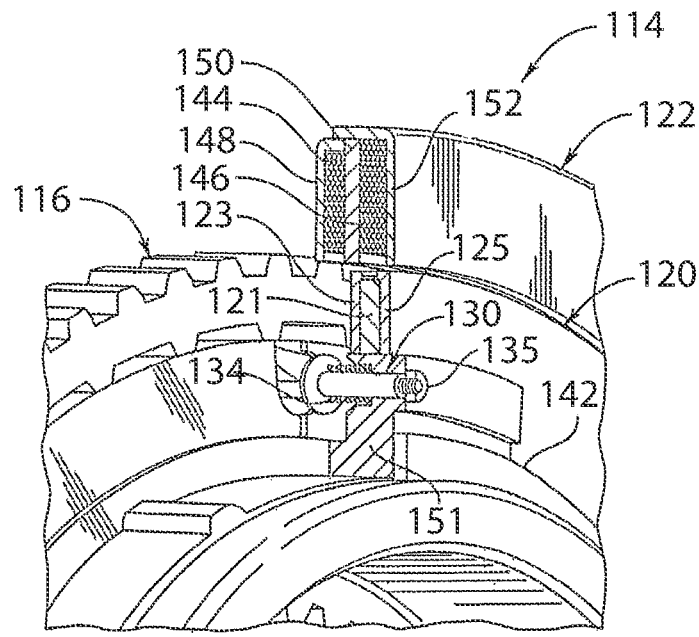
FIG. 2B is a perspective view, partially broken away and in cross-section, of the DCC with a linear actuator of the DCC being in an "off" position whereby the DCC is in a freewheel mode.
Figure 2C:
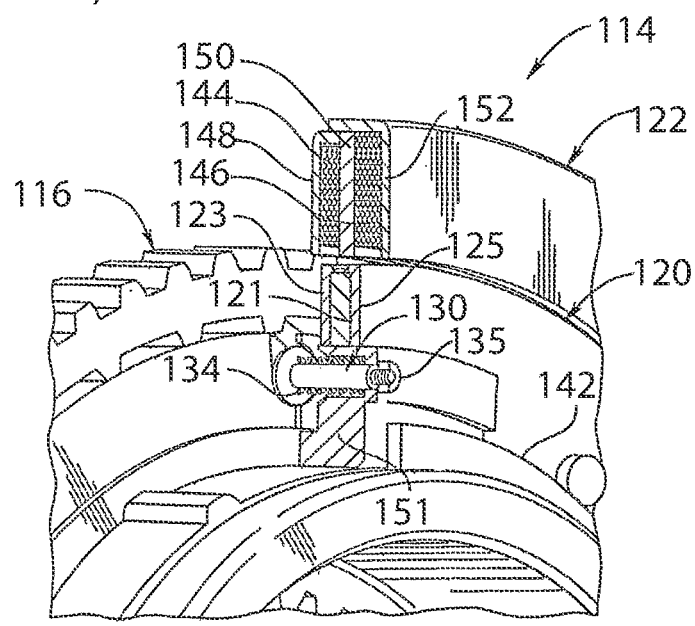
FIG. 2C is a perspective view, partially broken away and in cross-section, of the DCC with the linear actuator being in an "on" position whereby the DCC is in a lock mode.
Figure 2D:
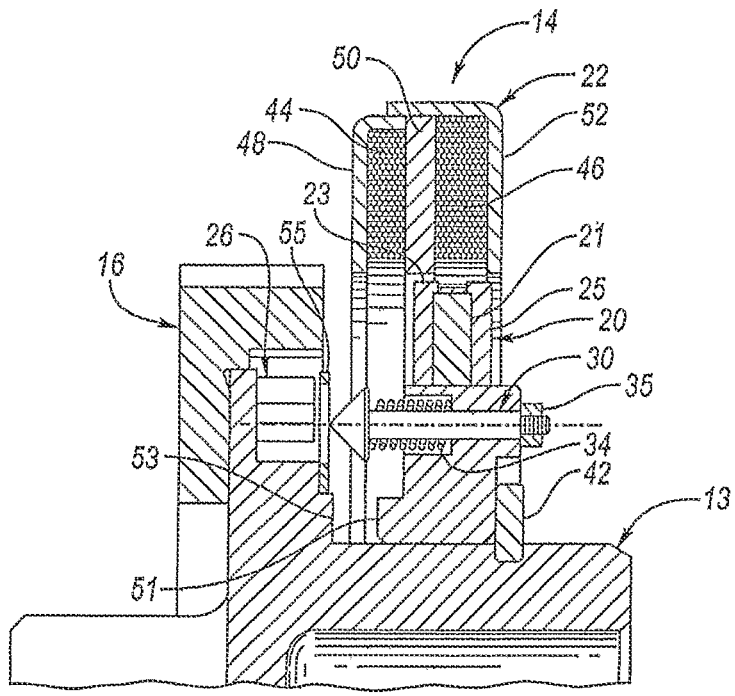
FIG. 2D is a side view, partially broken away and in cross-section, of the DCC with a translator of the linear actuator magnetically latched in the "off" position, wherein FIGS. 2B and 2D pertain to the same condition of the DCC.
Figure 2E:
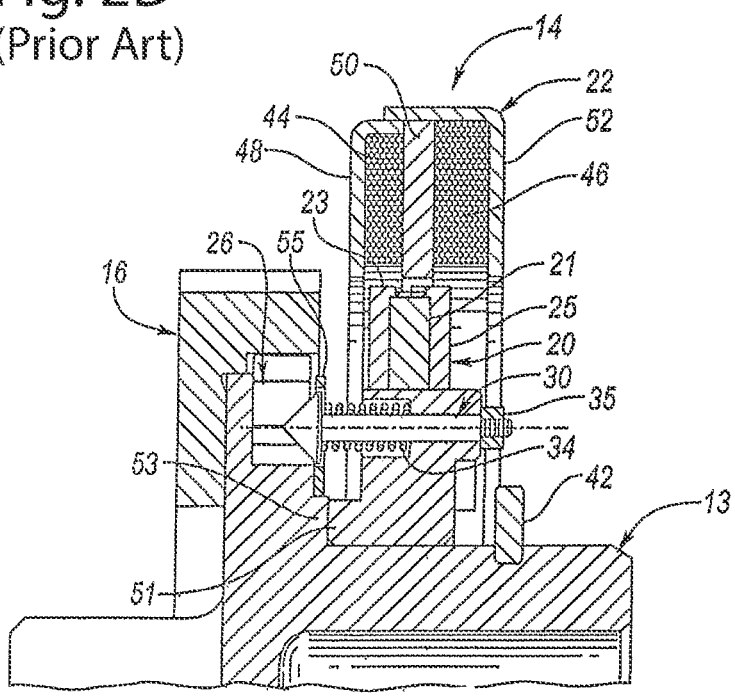
FIG. 2E is a side view, partially broken away and in cross-section, of the DCC with the translator of the linear actuator magnetically latched in the "on" position, wherein FIGS. 2C and 2E pertain to the same condition of the DCC.
Figure 3:
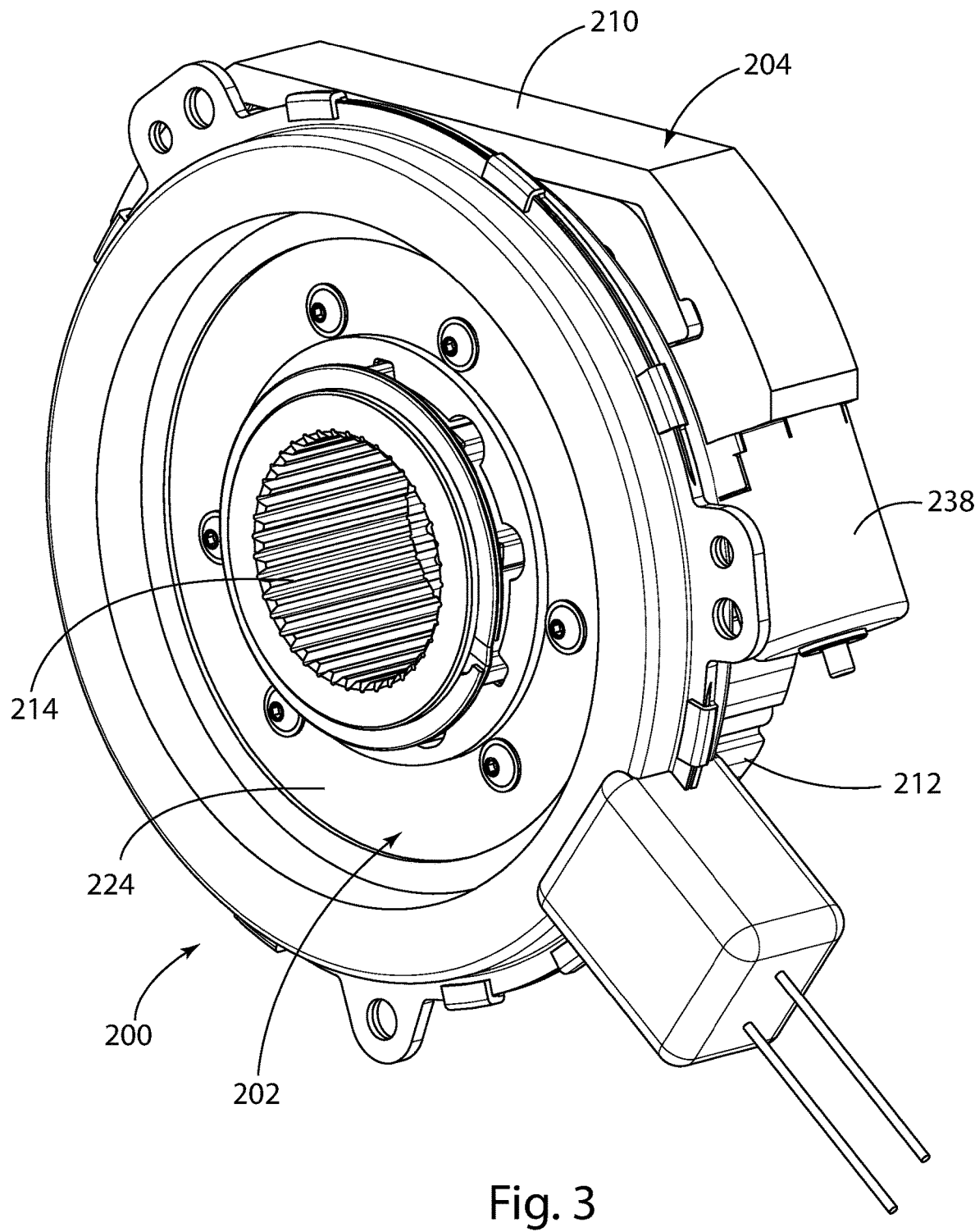
FIG. 3 is a perspective view of a clutch assembly having an integrated dynamically controllable clutch and controllable mechanical diode clutch in accordance with embodiments of the present invention.
Figure 4:
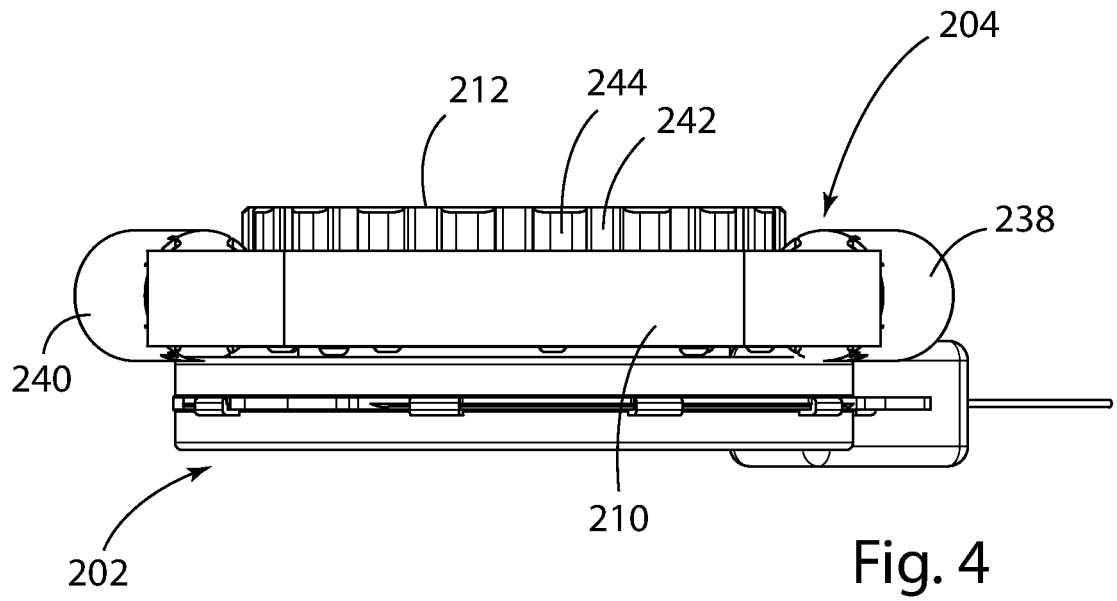
FIG. 4 is a top view of the clutch assembly shown in FIG. 3.
Figure 5:
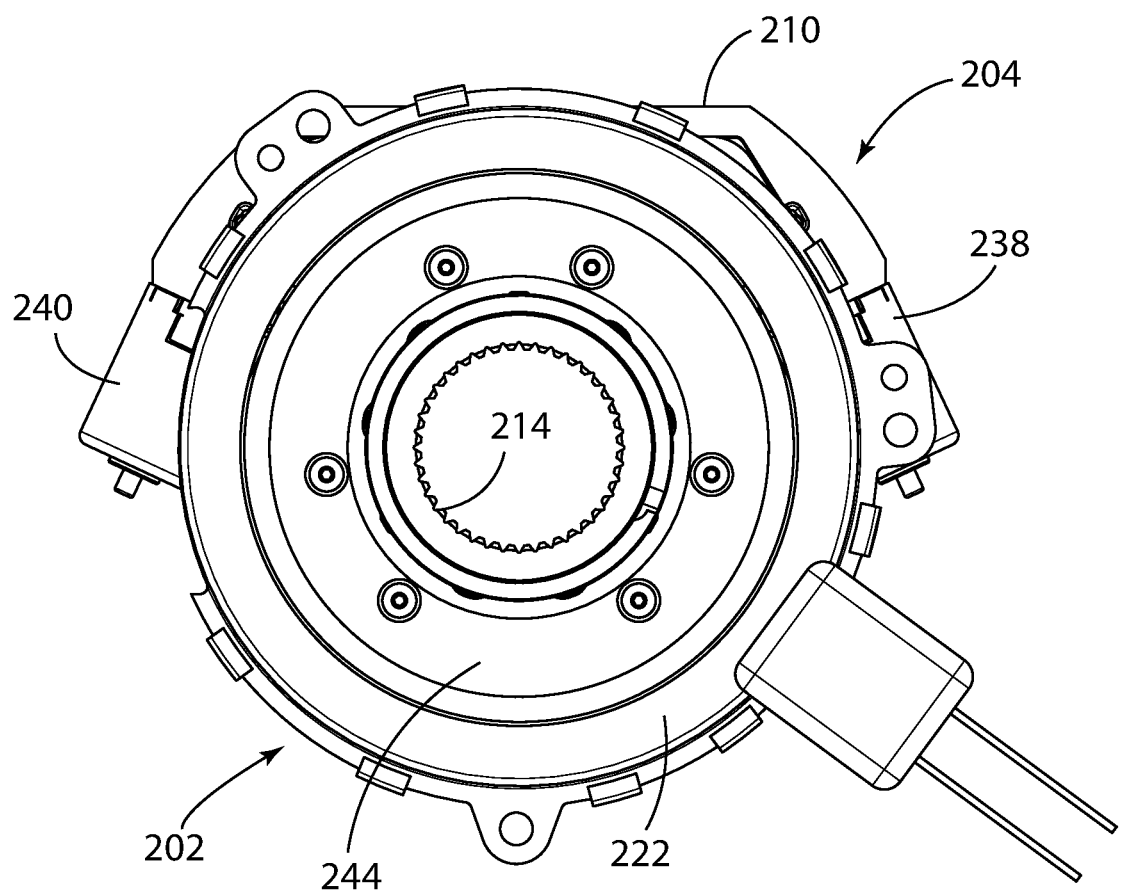
FIG. 5 is a side view of the clutch assembly shown in FIG. 3.
Figure 6:
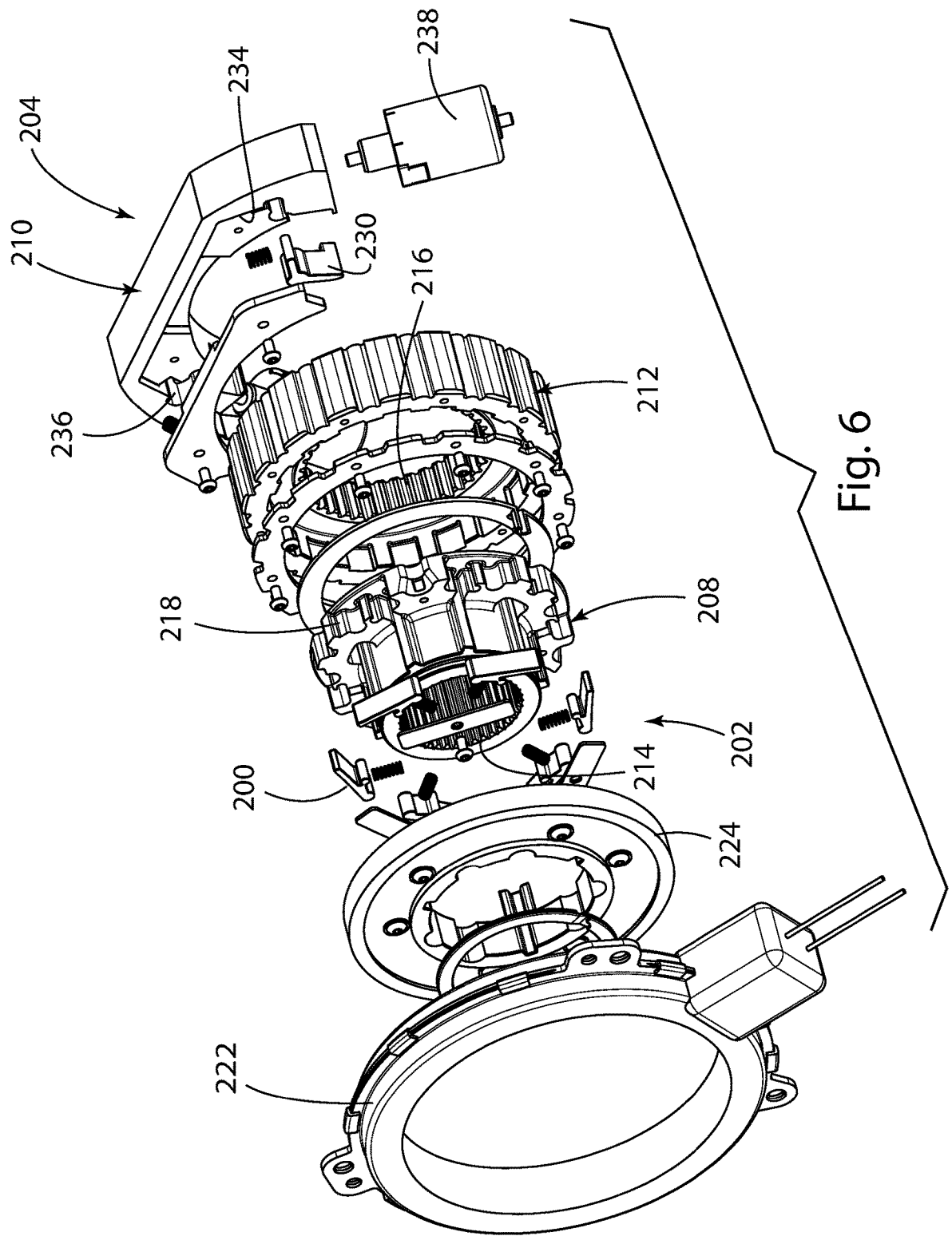
FIG. 6 is an exploded perspective view of the clutch assembly shown in FIG. 3.
Figure 7:
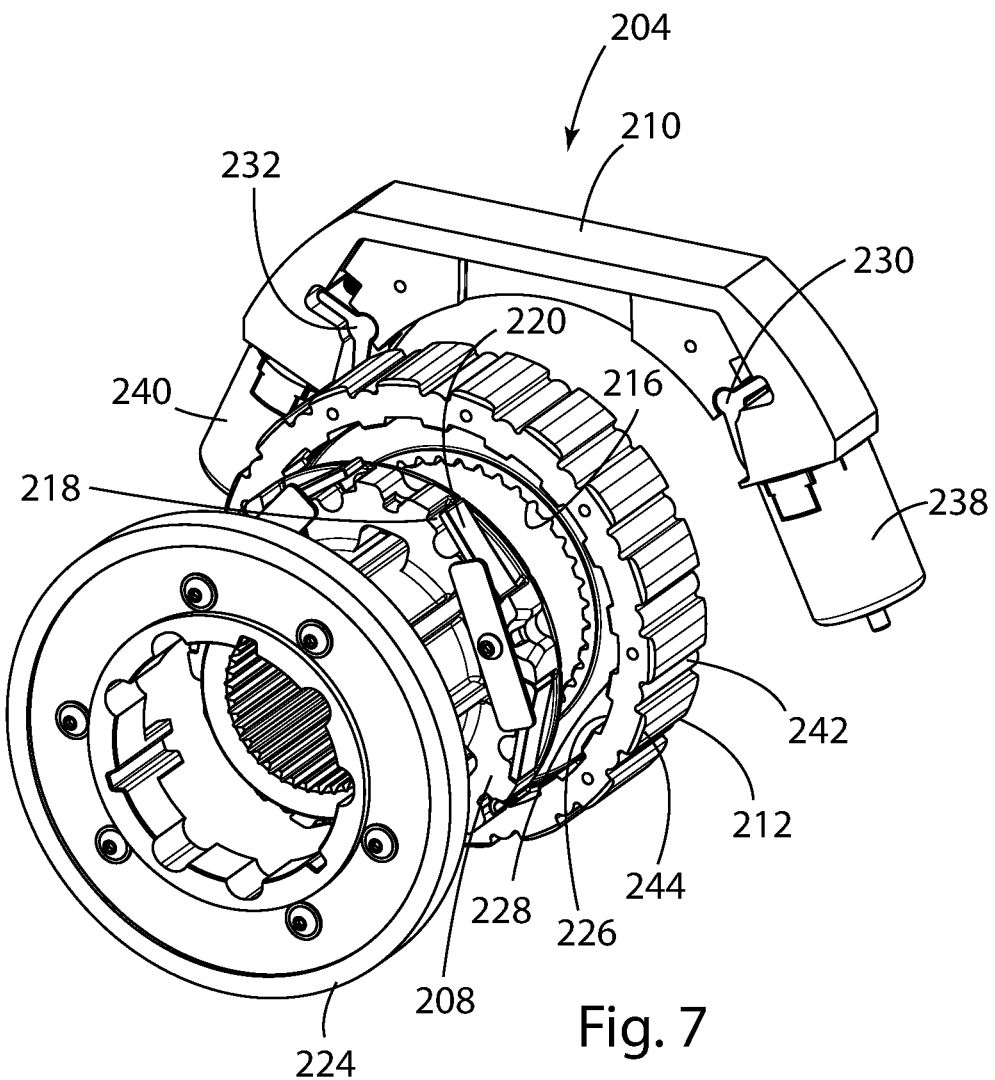
FIG. 7 is a right-side, partial exploded perspective view of the clutch assembly shown in FIG. 3.
Figure 8:
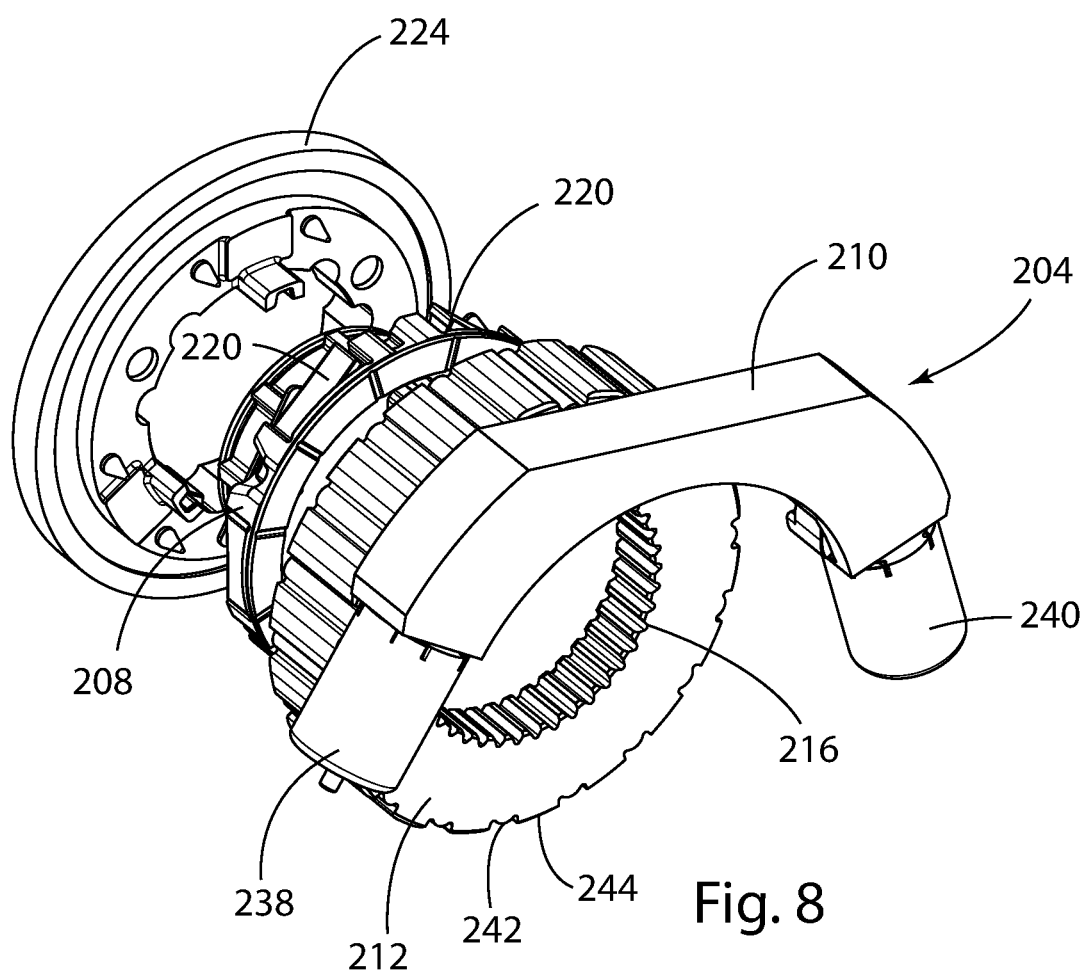
FIG. 8 is a left-side, partial exploded perspective view of the clutch assembly shown in FIG. 3.

Referring now to FIGS. 3-5, with continual reference to FIGS. 1 and 2, a clutch assembly, generally seen at 200 in accordance with embodiments of the present invention is shown. The clutch assembly 200 includes a first clutch 202. The first clutch 202 may be a Dynamically Controllable Clutch ("DCC") in one exemplary embodiment. The clutch assembly 200 further includes a second clutch 204. The second clutch 204 may be an electrically actuated Controllable Mechanical Diode (CMD) clutch in one exemplary embodiment. The second clutch or the electrically actuated Controllable Mechanical Diode (CMD) clutch may operate as a park-lock, hill-hold clutch ("park-lock clutch"). In the exemplary embodiment, the first clutch 202 or Dynamically Controllable Clutch ("DCC") and the second clutch 204 or Controllable Mechanical Diode clutch (CMD) are integrated; both the first and second clutches 202, 204 act on or share a common element, for example, a common coupling member or notch plate 212.

The DCC 202 generally includes the same type of components as the prior art DCC 112 shown in FIGS. 2A-2E. The CMD 204 generally includes the same type of components as the prior art CMD-e clutch 12 shown in FIGS. 1A-1C. However, instead of the two clutches having four coupling members in total, as would be the case for prior art DCC 112 and prior art CMD-e clutch 12, the first clutch or DCC 202 and the second clutch or CMD 204 of clutch assembly 200 have a total of three coupling members as one of the coupling members, the common coupling member or notch plate 212, is shared by the first clutch or DCC 202 and the second clutch or CMD 204.

FIGS. 6-9 show the first clutch or DCC 202, including a radially inner race, i.e., a first coupling member in the form of a first or DCC pocket plate 208. The second clutch or CMD 204 includes a radially outer race, i.e., a second coupling member in the form of a second or CMD pocket plate 210. The first and second clutches 202, 204 share a radially intermediate race, i.e., a third coupling member in the form of the shared or common notch plate 212. The DCC pocket plate 208 and the shared or common notch plate 212 are supported for rotation about a rotational axis extending axially through clutch assembly 200. The CMD pocket plate 210 remains stationary, fixed in position, such as fixed to a transmission case.

The clutch assembly 200 may be used in a system having an input power component, such as an input gear or input shaft, and an output power component, such as an output gear or output shaft. The first or DCC pocket plate 208 includes a plurality of inner splines 214 for fixedly connecting the first or DCC pocket plate 208 to one of the input or output power components. The shared notch plate 212 includes a plurality of inner splines 216 for fixedly connecting the shared notch plate 212 to the other of the output power component or input power component.

The first or DCC pocket plate 208 is referred to as a pocket plate because it includes at least one pocket 218. The first clutch or DCC 202 includes a first or DCC radial locking element 220. The DCC locking element 220 is positioned within pocket 218 of the first or DCC pocket plate 208. The first or DCC locking element 220 moves between a first or deployed position in which the first or DCC locking element 220 extends out of first or DCC pocket plate 208 and a second or non-deployed position in which the DCC locking element 220 remains in, does not extend out of, the pocket 218 of the first or DCC pocket plate 208.

The first clutch or DCC 202 includes a linear actuator having a stator 222 and a translator 224. The stator 222 is fixed in position, while the translator 224 moves linearly between lateral, i.e., axial, positions. The translator 224 is fixedly connected to and rotates with the first or DCC pocket plate 208. The stator 222 is controlled to move translator 224 between the axial positions. The translator 224 and the first or DCC locking element 220 are arranged such that the movement of translator 224 to a first axial position moves the first or DCC locking element 220 to the deployed position, and the movement of translator 224 to a second axial position moves the first or DCC locking element 220 to the non-deployed position.

In the deployed position, the first or DCC locking element 220 engages a notch 226 of shared notch plate 212, on an inner diameter surface 228 of the shared notch plate 212, to mechanically couple the first or DCC pocket plate 208 and the shared notch plate 212 together thereby preventing rotation of first or DCC pocket plate 208 relative to shared notch plate 212 in at least one direction about the rotational axis.

In the non-deployed position, the first or DCC locking element 220 does not engage any notch 226 of the shared notch plate 212. Accordingly, the first or DCC pocket plate 208 and the shared notch plate 212 are not mechanically coupled by the first or DCC locking element 220. In this case, the first or DCC pocket plate 208 rotates relative to the shared notch plate 212 in both a first and second direction about the rotational axis, for example, clockwise and counterclockwise.

The second clutch or CMD 204 includes first and second locking elements 230, 232. The first and second locking elements may also be referred to as a first CMD locking element 230 and a second CMD locking element 232. The first locking element 230 is positioned within a first pocket 234 of the second or CMD pocket plate 210. The second locking element 232 is positioned within a second pocket 236 of the second or CMD pocket plate 210. The second clutch or CMD 204 also includes first and second solenoids, i.e., first and second actuators, 238, 240 mounted or affixed to the second or CMD pocket plate 210. The first and second solenoids or actuators 238, 240 may also be referred to as a first CMD solenoid or actuator 238 and a second CMD solenoid or actuator 240.

The second clutch or CMD 204 includes first and second resilient members or springs 246, 248 acting on the first and second locking elements 230, 232. The resilient members or springs 246, 248 apply a force on the respective first and second locking elements 230, 232 to urge them into engagement with the notches 242 on the outer diameter or peripheral surface 244 of the common or shared notch plate 212. Using the resilient members or springs 246, 248 to apply an engagement force allows for ratcheting or overrunning.

Figure 9:
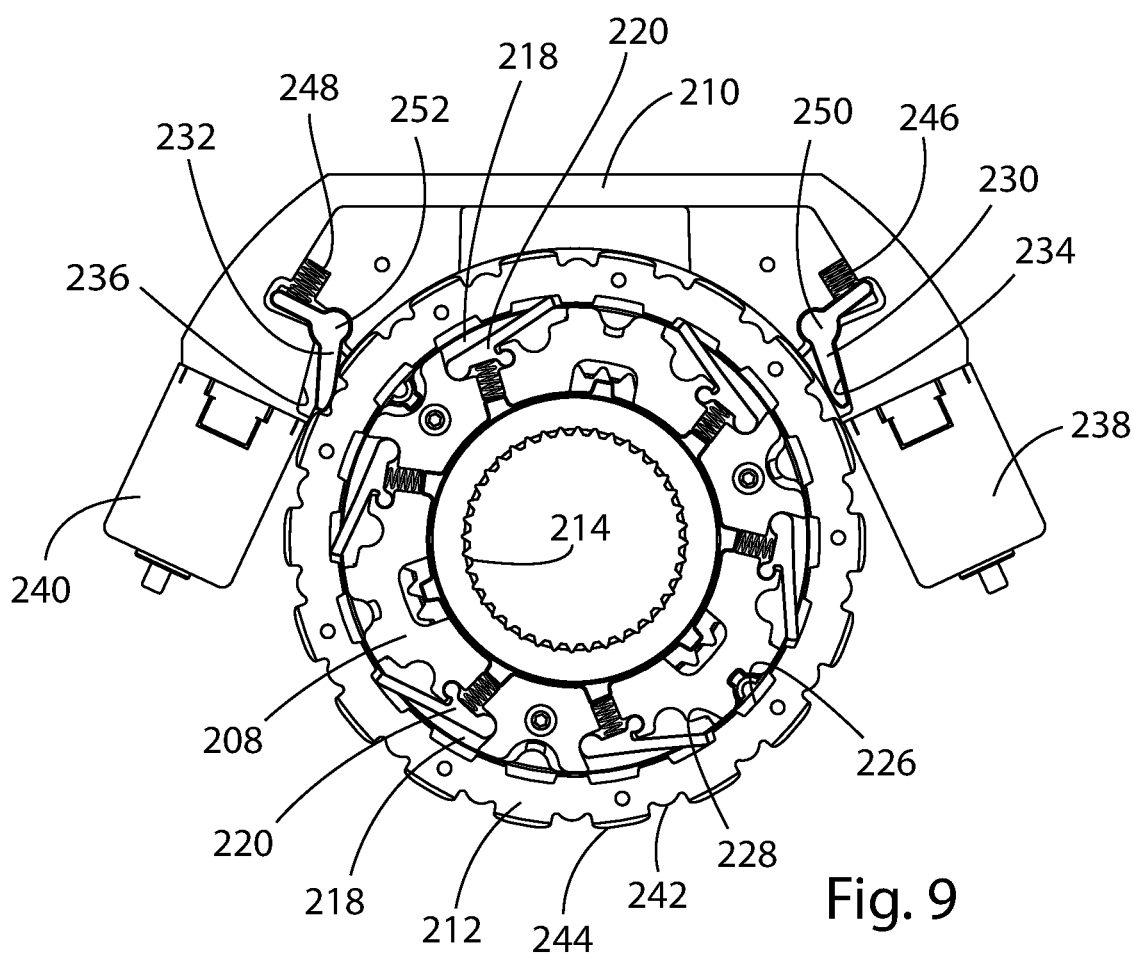
FIG. 9 is a cross-sectional view, with portions removed for clarity, of the clutch assembly shown in FIG. 3.

FIG. 9 shows the first actuator 238 in an "on" position, the first solenoid or actuator 238 acts on the first locking element 230, overcomes the force of the first resilient member or spring 246 and retracts the first locking element 230. The force applied by the first solenoid or actuator 238 pivots the first locking element 230 about a first pivot point 250, putting the first locking element 230 in a non-deployed position—located or disposed in the first pocket 234. In the non-deployed position, the common or shared notch plate 212 does not engage, is not tied to, and rotates freely with respect to the first locking element 230. When the first solenoid or actuator 238 is an "off" position, the first resilient member or spring 246 acts on the first locking element 230 pivoting the first locking element 230 about the first pivot point 250, wherein the first locking element 230 engages a notch 242 of the common or shared notch plate 212, putting the first locking element in a deployed position—extending from the first pocket 234. In the deployed position, the first locking element 230 prevents counterclockwise rotation of the common or shared notch plate 212 while allowing clockwise rotation of the common or shared notch plate 212.

The second solenoid or actuator 240 and second locking element 232 operate like the first solenoid or actuator 238 and first locking element 230. FIG. 9 shows the second solenoid or actuator 240 in an "off" position, the second resilient member or spring 248 acts on the second locking element 232 pivoting the second locking element 232 about a second pivot point 252, wherein the second locking element 232 engages a notch 242 of the common or shared notch plate 212, putting the second locking element 232 in a deployed position— extending from the second pocket 236. In the deployed position, the second locking element 232 prevents clockwise rotation of the common or shared notch plate 212 while allowing counterclockwise rotation of the common or shared notch plate 212. When the second solenoid or actuator 240 is in an "on" position the second solenoid or actuator 240 acts on the second locking element 232, overcomes the force of the second resilient member or spring 248 and retracts the second locking element 232. The force applied by the second solenoid or actuator 238 pivots the second locking element 232 about the second pivot point 252 putting the second locking element 232 in a non-deployed position—located or disposed in the second pocket 236. In the non-deployed position, the common or shared notch plate 212 does not engage, is not tied to, and rotates freely with respect to the second locking element 232.

The first and second resilient members or springs 246, 248 apply an engagement force to the respective first and second locking elements 230, 232. The engagement force applied by the first and second resilient members or springs 246, 248 urges the respective first and second locking elements 230, 232 to the deployed position. The first and second solenoids or actuators 238, 240 overcome the force applied by the respective first and second resilient members or springs 246, 248 to disengage, retract the first and second locking elements 230, 232 into the respective first and second pockets 234, 236, placing the first and second locking elements 230, 232, in a non-deployed position.

The first and second resilient members or springs 246, 248 place the respective first and second locking elements 230, 232 of the second clutch or CMD 204 in a deployed position. The first and second solenoid or actuators 238, 240 place the first and second locking elements 230, 232 in a non-deployed position. Activation of one of the respective first and second solenoids or actuators 238, 240 may be based on a vehicle's orientation, uphill or downhill. In one example, if only one of the first and second solenoids or actuators 238, 240 is activated, in an "on" condition, at the same time, then only one of the respective first and second locking elements 230, 232 is in a retracted or non-deployed position. Deploying one of the first and second locking elements 230, 232 while not deploying the other of the first and second locking elements 230, 232 prevents rotation of the shared notch plate 212 in one of the first or second directions of rotation about the rotational axis while allowing rotation in the opposite direction. The combination or shared notch plate 212 may rotate in one direction but not the other, for example, clockwise but not counterclockwise. In this example, the second clutch or CMD 204 may place a transmission and, correspondingly, the vehicle in a "hill-hold mode," the vehicle may move in one direction, forward, but not the other direction, reverse.

In another example, when the first and second solenoids or actuators 238, 240 are placed in the "off" condition, the first and second resilient members or springs 246, 248 simultaneously deploy the respective first and second locking elements 230, 232 and prevent both first and second directions of rotation of the shared notch plate 212 about the rotational axis, for example, clockwise and counterclockwise rotation. In this example, the second clutch or CMD 204 may place a transmission and, correspondingly, the vehicle in a "park-lock mode," wherein the vehicle does not move in either direction, forward or reverse.

When the first and second solenoids or actuators 238, 240 of the second clutch or CMD 204 move the first and second locking elements 230, 232 to a non-deployed position, in which shared notch plate 212 is not mechanically coupled to the second or CMD pocket plate 210 of the second clutch or CMD 204, the shared notch plate 212 rotates in both the first and second directions about the rotational axis.

In one exemplary embodiment, the present invention is a clutch assembly having integrated first and second clutches, wherein the first clutch is a dynamically controllable clutch ("DCC") and the second clutch is an electrically actuated Controllable Mechanical Diode ("CMD") clutch.

The first, dynamically controllable clutch ("DCC"), controls engagement and disengagement of the input/output power components and the second, Controllable Mechanical Diode ("CMD") clutch, provides a park-lock, hill-hold clutch controlling braking of the power components. Thus, the clutch assembly includes a DCC and a CMD clutch.

The DCC and CMD clutch each include their own coupling member and share another coupling member. For example, the first or DCC clutch 202 includes a coupling member, the first or DCC pocket plate 208, the second or CMD clutch includes a coupling member, the second or CMD pocket plate 210, and both share the common or shared notch plate 212. Thus, the clutch assembly 200 includes a first coupling member that belongs to the first or DCC clutch 202, a second coupling member that belongs to the second or CMD clutch 204, and a third coupling member—the notch plate 212, which belongs to both the first or DCC clutch 202 and the second or CMD clutch 204.

The first coupling member may be a first or DCC pocket plate 208, the second coupling member may be a second or CMD pocket plate 210, and the third coupling member may be a notch plate 212 shared by the first or DCC clutch 202 and the second or CMD clutch 204.

A clutch is an assembly that connects and disconnects two components, for example, a driving and a driven part of a mechanism. Shared herein means that each of the first and second clutches has a common component, in the exemplary embodiment the notch plate 212.

The first or DCC pocket plate 208 and the shared notch plate 212 are supported for rotation in the first and second directions about a rotational axis. The second or CMD pocket plate 210 remains stationary, fixed in position, for example, splined to a transmission case.

In the case of the clutch assembly 200 used with a system having an input power component, such as an input gear, and an output power component, such as an output shaft, the shared notch plate 212 is fixedly connected to the input gear and the first or DCC pocket plate 208 is fixedly connected to the output shaft. The input and output could be switched with respect to the shared notch plate 212 and first or DCC pocket plate 208.

The locking element 220 of the first clutch or DCC 202 is disposed or located in a pocket 218 of the first or DCC pocket plate 208. The first clutch or DCC 202 includes at least one locking element 220 and a linear actuator having a stator 222 and a translator 224. The translator 224 moves the first or DCC locking element 220 to a deployed position in which the first or DCC locking element 220 extends from the pocket 218 and engages a notch 226 of the shared notch plate 212 on an inner diameter or inner peripheral surface 228 of the shared notch plate 212, to mechanically couple the first or DCC pocket plate 208 and the shared notch plate 212 together thereby preventing relative rotation of the first or DCC pocket plate 208 and the shared notch plate 212 in at least one direction about the rotational axis.

In the disclosed example, the second or CMD pocket plate 210 of the second clutch or CMD 204 includes first and second CMD locking elements 230, 232, first and second resilient members or springs 246, 248, and first and second electromechanical components or actuators, for example, solenoids or actuators 238, 240. The first resilient member or spring 246 moves the first CMD locking element 230 to a deployed position in which the first CMD locking element 230 engages a notch 242 of the shared notch plate 212, on an outer diameter or peripheral surface 244 of the shared notch plate 212, to mechanically couple the shared notch plate 212 to the second or CMD pocket plate 210 of the second clutch or CMD 204 thereby preventing a first direction of rotation of the shared notch plate 212 about the rotational axis. Likewise, the second resilient member or spring 248 moves the second CMD locking element 232 to a deployed position in which the second CMD locking element 232 engages a notch 242 of the shared notch plate 212, on the outer diameter or peripheral surface 244 of the shared notch plate 212, to mechanically couple the shared notch plate 212 to the second or CMD pocket plate 210 of the second clutch were CMD 204 thereby preventing an opposite or second direction of rotation of the shared notch plate 212 about the rotational axis. Extending or deploying both the first and second locking elements 230, 232 prevents both first and second directions of rotation of the shared notch plate 212 about the rotational axis, i.e., a "park-lock mode." Simultaneously activating, turning "on," the first and second actuators or solenoids 238, 240 retracts, places the first and second locking elements 230, 232 in the non-deployed mode, wherein the common or shared notch plate 212 rotates freely about the rotational axis in both the first and second directions of rotation.

Sharing the notch plate 212 with other components, for example, the first or DCC pocket plate 208 and the second or CMD pocket plate 210 of the respective first clutch or DCC 202 and second clutch or CMD 204, integrates the first clutch or DCC 202 and the second clutch or CMD 204.

When the translator 224 of the first clutch or DCC 202 moves the DCC locking element 220 to a non-deployed position, in which the first or DCC pocket plate 208 and the shared notch plate 212 are not mechanically coupled together by the DCC locking element 220, the first or DCC pocket plate 208 may rotate relative to the shared notch plate 212 in the first and second directions about the rotational axis, for example clockwise and counterclockwise.

Likewise, the first and second solenoids or actuators 238, 240 of the second clutch or CMD 204 move the first and second CMD locking elements 230, 232, respectively, to a non-deployed position in which the shared notch plate 212 is not mechanically coupled to the second or CMD pocket plate 210 of the second clutch or CMD 204. In this case, the shared notch plate 212 may rotate in the first and second directions about the rotational axis, for example, clockwise and counterclockwise.

While the second or CMD pocket plate 210 of the second clutch or CMD 204 includes first and second CMD locking elements 230, 232, and first and second electromechanical components or actuators, for example, solenoids or actuators 238, 240, the second or CMD pocket plate 210 of the second clutch or CMD 204 may have a single locking element that engages the shared notch plate 212 and a corresponding single solenoid or actuator. In this embodiment, engaging the single locking element prevents rotation of the shared notch plate in both directions of rotation.

As described, the clutch assembly 200, in accordance with embodiments of the present invention, represents an integrated clutch arrangement with a disconnect clutch, such as a DCC, and a park-lock, hill-hold clutch, for example, CMD clutch.

Electric and hybrid vehicles ("EVs") benefit from using a disconnect system to disengage the e-machine and/or gearbox when power, regen, or reverse is not required; this may be a secondary axle drive that may disconnect at highway speeds, wherein the additional torque is not required. EVs are normally required to have a park-lock functionality and usually have hill-hold functionality. The complexity of multiple systems at various points in the architecture adds cost and mass. Integrating the units, disconnect, park-lock, and hill-hold provides a clutch assembly 200 in accordance with embodiments of the present invention and reduces the number of components.

In operation of one embodiment, the first clutch or DCC 202 couples or decouples the e-machine and/or gearbox from the drive wheels. The second clutch or CMD 204 grounds the drive wheels to prevent rotation, in park-lock—rotation is prevented in both directions, and in hill-hold—rotation is only prevented in a first direction when the EV is on an ascending surface. Rotation is only prevented in a second direction when the EV is on a descending surface.

The clutch assembly 200, in accordance with embodiments of the present invention, meets emerging needs for disconnect devices and continuing needs for park-lock and hill-hold systems. In combination, the clutches of the clutch assembly can act as a 0:0, 0:1, 1:0, 1:1 clutch and has the ability to integrate components to react torque at several nodes, gearbox (e-machine), drive wheels, and ground (housing).

The clutch assembly 200, in accordance with embodiments of the present invention, leverages overrun functionality (0:1), allows for differentiation from dog clutch technology, and has the ability to combine components into a single module leveraging OWC technology with overrun capabilities.

As described, the clutch assembly 200, in accordance with embodiments of the present invention, combines e-machine disconnect functionality with park-lock functionality, which inherently includes hill-hold functionality.

The clutch assembly 200, in accordance with embodiments of the present invention, may be used at the input of gearbox, directly at e-machine, and thus benefits from higher ratchet speed requirements and lower torques. If moved closer to the output, higher efficiency gains are possible.

In embodiments of the clutch assembly 200, the layout and configuration of the first clutch or DCC 202 clutch elements and the second clutch or CMD 204 elements are modified such that the torque path for grounding out the wheels may or may not go through the first clutch or DCC 202.

In addition to EV applications, the clutch assembly 200, in accordance with embodiments of the present invention, may find use in aerospace applications; for example, wheels and wheel tug type applications can benefit from a park-lock hill-hold system.

Embodiments of the present invention are disclosed herein; however, it is understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting but merely as a representative basis for teaching one skilled in the art to variously employ the present invention.

While exemplary embodiments are described above, it is not intended that these embodiments describe all possible forms of the present invention. Rather, the words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary in nature; thus, variations that do not depart from the gist of the invention are intended to be within the scope of the invention. Such variations are not to be regarded as a departure from the spirit and scope of the invention.

What is claimed is:

1. A clutch assembly comprising:
   first and third coupling members supported for rotation relative to one another in first and second directions about a rotational axis, and a second coupling member fixed in position;
   a first locking element;
   a second locking element;
   a translator configured to move the first locking element to a deployed position in which the first locking element mechanically couples the first and third coupling members together to prevent relative rotation of the first and third coupling members in at least one direction about the rotational axis;
   a first actuator configured to move the second locking element to a deployed position in which the second locking element mechanically couples the second and third coupling members together to prevent rotation of the third coupling member relative to the second coupling members in a first direction about the rotational axis;
   the first coupling member is a first pocket plate;
   the second coupling member is a second pocket plate;
   the third coupling member is a notch plate, the notch plate having a plurality of notches in an inner peripheral surface and a plurality of notches in an outer peripheral surface;
   the first locking element in the deployed position extends out from a pocket of the first pocket plate and engages one of the notches in the inner peripheral surface of the notch plate; and
   the second locking element in the deployed position extends out from a pocket of the second pocket plate and engages one of the notches in the outer peripheral surface of the notch plate.

2. The clutch assembly of claim 1 wherein:
   the translator moves the first locking element to a non-deployed position in which the first and third coupling members are not mechanically coupled by the first locking element, whereby the first and third coupling members may rotate relative to one another about the rotational axis.

3. The clutch assembly of claim 2 wherein:
   the first actuator moves the second locking element to a non-deployed position in which the second and third coupling members are not mechanically coupled by the second locking element, whereby the third coupling member can rotate relative to the second coupling member in the first direction about the rotational axis.

4. The clutch assembly of claim 1 including:
   an input gear; and
   an output shaft, wherein the first coupling member is fixedly connected to the output shaft, and the third coupling member is fixedly connected to the input gear.

5. A clutch assembly comprising:
   first and third coupling members supported for rotation relative to one another in first and second directions about a rotational axis, and a second coupling member fixed in position;
   a first locking element;
   a second locking element;
   a translator configured to move the first locking element to a deployed position in which the first locking element mechanically couples the first and third coupling members together to prevent relative rotation of the first and third coupling members in at least one direction about the rotational axis;
   a first actuator configured to move the second locking element to a deployed position in which the second locking element mechanically couples the second and third coupling members together to prevent rotation of the third coupling member relative to the second coupling members in a first direction about the rotational axis;
   a third locking element; and
   a second actuator configured to move the third locking element to a deployed position in which the third locking element mechanically couples the second and third coupling members together to prevent rotation of the third coupling member relative to the second coupling member in a second direction about the rotational axis.

6. The clutch assembly of claim 5 wherein:
   the first coupling member is a first pocket plate, the second coupling member is a second pocket plate, and the third coupling member is a notch plate.

7. The clutch assembly of claim 6 wherein:
   the first locking element in the deployed position extends out from a pocket of the first pocket plate and engages a notch on a first surface of the notch plate;
   the second locking element in the deployed position extends out from a first pocket of the second pocket plate and engages a notch on a second surface of the notch plate; and
   the third locking element in the deployed position extends out from a second pocket of the second pocket plate and engages a notch on the second surface of the notch plate.

8. A clutch assembly comprising:
   a notch plate;
   a dynamically controllable clutch, including a dynamically controllable clutch pocket plate, a dynamically controllable clutch locking element, and a dynamically controllable clutch translator;

wherein the dynamically controllable clutch pocket plate and the notch plate are supported for rotation relative to one another in first and second directions about a rotational axis; and the dynamically controllable clutch translator is configured to move the dynamically controllable clutch locking element to a deployed position in which the dynamically controllable clutch locking element mechanically couples the dynamically controllable clutch pocket plate and the notch plate to prevent relative rotation of the dynamically controllable clutch pocket plate and the notch plate with respect to each other in at least one direction about the rotational axis;

a controllable mechanical diode clutch, including a controllable mechanical diode clutch pocket plate, a first controllable mechanical diode clutch locking element, a second controllable mechanical diode clutch locking element, a first controllable mechanical diode clutch actuator, and a second controllable mechanical diode clutch actuator;

wherein the controllable mechanical diode clutch pocket plate is fixed in position and the notch plate is supported for rotation relative to the controllable mechanical diode clutch pocket plate in the first and second directions about the rotational axis; and the first controllable mechanical diode clutch actuator is configured to move the first controllable mechanical diode clutch locking element to a deployed position in which the first controllable mechanical diode clutch locking element mechanically couples the controllable mechanical diode clutch pocket plate and the notch plate together to prevent rotation of the notch plate in the first direction about the rotational axis; and the second controllable mechanical diode clutch actuator is configured to move the second controllable mechanical diode clutch locking element to a deployed position in which the second controllable mechanical diode clutch locking element mechanically couples the controllable mechanical diode clutch pocket plate and the notch plate together to prevent rotation of the notch plate in the second direction about the rotational axis.

9. The clutch assembly of claim 8 wherein:

the first controllable mechanical diode clutch actuator includes a solenoid and a spring, both the solenoid and spring of the first controllable mechanical diode clutch actuator act on the first mechanical diode clutch locking element; and the second controllable mechanical diode clutch actuator includes a solenoid and a spring, both the solenoid and spring of the second controllable mechanical diode clutch actuator act on the second mechanical diode clutch locking element.

10. A clutch assembly comprising:

first and third coupling members supported for rotation relative to one another in first and second directions about a rotational axis;

a second coupling member fixed in position;

a first locking element movable between a deployed position, in which the first locking element mechanically couples the first and third coupling members together to prevent relative rotation of the first and third coupling members in at least one direction about the rotational axis and a non-deployed position, in which the first and third coupling members are not mechanically coupled together by the first locking element whereby the first and third coupling members may rotate relative to one another about the rotational axis;

a second locking element movable between a deployed position, in which the second locking element mechanically couples the second and third coupling members together to prevent rotation of the third coupling member relative to the second coupling members in a first direction about the rotational axis, and a non-deployed position, in which the second and third coupling members together are not mechanically coupled by the second locking element whereby the third coupling member can rotate relative to the second coupling member in the first direction about the rotational axis;

a first actuator connected to the first locking element, the first actuator moving the first locking element to one of the deployed and non-deployed positions; and a second actuator connected to the second locking element, the second actuator moving the second locking element to one of the deployed and non-deployed positions;

a third locking element movable between a deployed position, in which the third locking element mechanically couples the second and third coupling members together to prevent rotation of the third coupling member relative to the second coupling members in a second direction about the rotational axis and a non-deployed position, in which the second and third coupling members together are not mechanically coupled by the second locking element whereby the third coupling member can rotate relative to the second coupling member in the second direction about the rotational axis; and a third actuator connected to the third locking element, the third actuator moving the second locking element to one of the deployed and non-deployed positions.

11. The clutch assembly of claim 10 wherein:

the third actuator includes a solenoid.

12. A clutch assembly comprising:

first and third coupling members supported for rotation relative to one another in first and second directions about a rotational axis, the third coupling member having an annular portion including an inner peripheral surface and an outer peripheral surface;

a second coupling member fixed in position;

a first locking element movable between a deployed position, in which the first locking element mechanically couples the first and third coupling members together at the inner peripheral surface of the annular portion of the third coupling member to prevent relative rotation of the first and third coupling members in at least one direction about the rotational axis and a non-deployed position, in which the first and third coupling members are not mechanically coupled together by the first locking element whereby the first and third coupling members may rotate relative to one another about the rotational axis;

a second locking element movable between a deployed position, in which the second locking element mechanically couples the second and third coupling members together at the outer peripheral surface of the annular portion of the third coupling member to prevent rotation of the third coupling member relative to the second coupling members in a first direction about the rotational axis, and a non-deployed position, in which the second and third coupling members together are not mechanically coupled by the second locking element whereby the third coupling member can rotate relative to the second coupling member in the first direction about the rotational axis;

a first actuator connected to the first locking element, the first actuator moving the first locking element to one of the deployed and non-deployed positions; and a second actuator connected to the second locking element, the second actuator moving the second locking element to one of the deployed and non-deployed positions.

13. The clutch assembly of claim 12 wherein:

the first actuator includes a linear actuator, the linear actuator includes a stator and a translator, the translator supported on the first coupling member.

14. The clutch assembly of claim 12 wherein:

the second actuator includes a solenoid.

15. The clutch assembly of claim 12 wherein:

in the deployed position, the first locking element extends out from a pocket of the first coupling member and engages a notch in the inner peripheral surface of the annular portion of the third coupling member; and in the deployed position, the second locking element extends out from a pocket of the second coupling member and engages a notch in the outer peripheral surface of the annular portion of the third coupling member.

16. The clutch assembly of claim 15 wherein:

the first actuator includes a linear actuator, the linear actuator includes a stator and a translator, the translator supported on the first coupling member.

17. The clutch assembly of claim 12 wherein:

the first actuator moves the first locking element to the deployed position.

18. The clutch assembly of claim 12 wherein:

the second actuator moves the second locking element to a deployed position.

19. The clutch assembly of claim 12 wherein:

the first actuator moves the first locking element to a non-deployed position.

20. The clutch assembly of claim 12 wherein:

the second actuator moves the second locking element to a non-deployed position.

* * * * *